(12) United States Patent
Yamanishi et al.

(10) Patent No.: US 7,556,864 B2
(45) Date of Patent: Jul. 7, 2009

(54) SINTERED GEAR

(75) Inventors: Yuji Yamanishi, Chiba (JP); Ryoji Sato, Chiba (JP); Kei Ishii, Chiba (JP); Tomoaki Arakawa, Chiba (JP); Jyun-ichi Yamada, Chiba (JP); Tadayuki Tsutsui, Chiba (JP); Akira Fujiwara, Saitama (JP)

(73) Assignees: Hitachi Powdered Metals Co., Ltd. (JP); Honda Giken Kogyo Kabushiki Kaisha (JP)

( * ) Notice: Subject to any disclaimer, the term of this patent is extended or adjusted under 35 U.S.C. 154(b) by 302 days.

(21) Appl. No.: 10/529,866

(22) PCT Filed: Oct. 3, 2003

(86) PCT No.: PCT/JP03/12723

§ 371 (c)(1),
(2), (4) Date: Mar. 30, 2005

(87) PCT Pub. No.: WO2004/030852

PCT Pub. Date: Apr. 15, 2004

(65) Prior Publication Data

US 2005/0272545 A1 Dec. 8, 2005

(30) Foreign Application Priority Data

Oct. 4, 2002 (JP) ............................. 2002-292287

(51) Int. Cl.
*B22F 5/08* (2006.01)
*F16H 55/02* (2006.01)
*F16H 55/14* (2006.01)
*F16H 55/16* (2006.01)
*B32B 3/02* (2006.01)
*B32B 5/14* (2006.01)
*B32B 5/32* (2006.01)

(52) U.S. Cl. .................... 428/602; 428/613; 428/304.4; 74/457; 74/460

(58) Field of Classification Search ...................... None
See application file for complete search history.

(56) References Cited

U.S. PATENT DOCUMENTS 5,453,242 A 9/1995 Knoess (Continued)

FOREIGN PATENT DOCUMENTS

JP 2000-239710 A 9/2000

OTHER PUBLICATIONS

International Appln. JP National Publication No. 06-501988, Mar. 3, 1994, Formflo Ltd.

(Continued)

*Primary Examiner*—Jennifer McNeil
*Assistant Examiner*—Jason L Savage
(74) *Attorney, Agent, or Firm*—Kilpatrick Stockton LLP

(57) ABSTRACT

Disclosed is a sintered gear composed of a sintered alloy having a metal matrix and pores. The tooth surface (2, 3, 4) of the tooth and the bottom land (5) have a densified layer (11) in which the porosity is reduced to 10% or less from the sintered alloy. The densified layer at the tooth surface is formed with a thickness of 300 to 1,000 microns, and the densified layer at the bottom land is formed with a thickness of 10 to 300 microns. The boundary surface of the densified layer is continuous from the tooth surface side to the bottom land side so as not to have a substantial level difference.

7 Claims, 3 Drawing Sheets

U.S. PATENT DOCUMENTS

| | | | |
|---|---|---|---|
| 5,711,187 A * | 1/1998 | Cole et al. .................... | 74/434 |
| 5,884,527 A * | 3/1999 | Cole et al. .................... | 74/434 |
| 6,517,772 B1 * | 2/2003 | Woolf ......................... | 419/28 |
| 7,137,312 B2 * | 11/2006 | Cole ........................... | 74/462 |
| 2003/0061904 A1 * | 4/2003 | Fujiwara ..................... | 75/246 |
| 2003/0155041 A1 * | 8/2003 | Bengtsson et al. .......... | 148/208 |
| 2003/0228949 A1 * | 12/2003 | Okabe et al. ................ | 474/161 |

OTHER PUBLICATIONS

Takeya et al., "Surface Rolling of Sintered Gears", SAE Technical Papers Series, Society of Automotive Engineers, 1982, pp. 1-8.

* cited by examiner

SINTERED GEAR

TECHNICAL FIELD

The present invention relates to a sintered gear manufactured by compacting a metal powder and sintering the compacted matter, and includes general gears in which convex teeth engage with each other and power transmission vehicles such as chain wrapping vehicles. The present invention is particularly concerned with a sintered gear of which strength and noise reduction characteristics are required, and includes silent chain sprocket wheels.

BACKGROUND ART

Sintered gears are generally manufactured as follows: a metal powder is filled in a mold, which is compressed by the use of a punch in the vertical direction to form a compact; and the compact obtained in the shape of a gear is sintered. Since such a sintered gear can be manufactured in large quantities at low costs, sintered gears of various applications are commercially available as varied products. In the sintered gear, pores remain in a metal matrix due to the manufacturing method. Accordingly, density of the material forming the gear is lower than real density. This leads to a problem that strength of the gear is reduced in comparison with a general gear made of wrought steel having real density. Conventionally, this problem is addressed by: use of a higher grade material than the material of the wrought steel gear, to make up for a deficiency in strength; employing a 2P-2S method in which pressing and sintering are performed twice (pressing, provisional sintering, secondary pressing, and sintering) in the manufacturing process; or applying warm pressing technique of pressing the powder in a warm environment or the like for densification.

In recent years, however, the need for lower cost has been increasing. Use of a high-grade material and application of complicated manufacturing process are extremely disadvantageous in meeting the need and it makes difficult to solve the problem. For this reason, a sintered gear having a high strength that can be manufactured by using inexpensive material and simple manufacturing method has been much sought after.

In this connection, it has been proposed that, in the gear formed by pressing and sintering a powdered metal material, the teeth, tooth root and flank regions of the gear are surface-hardened to establish densification ranging between 90 to 100% up to the depth of at least 380 microns (Refer to International Patent Application Japanese National Publication No. H6-501988, pages 2 to 3, FIG. 1, for example).

On the other hand, the gear is a member for transmitting power by engaging with the other member's teeth or a chain and rotating together, and the contact and friction on the engaging portion of the gear makes noise. The need to suppress this noise and improve noise reduction characteristics in gears has also been increasing.

An object of the present invention is to meet the above-mentioned needs and provide a sintered gear that can be easily manufactured at lower cost and has good noise reduction characteristics.

DISCLOSURE OF INVENTION

To solve the above-mentioned problem, a sintered gear of the present invention is a sintered gear composed of a sintered alloy having a metal matrix and pores, and a feature is to have a first densified layer that is formed on a tooth surface with a thickness of 300 to 1,000 microns and a porosity of 10% or less and a second densified layer that is formed on a bottom land with a thickness of 10 to 300 microns and a porosity of 10% or less, a boundary of the first densified layer being continuous with a boundary of the second densified layer without a substantially sharp level difference.

BEST MODE FOR CARRYING OUT THE INVENTION

Figure 1:
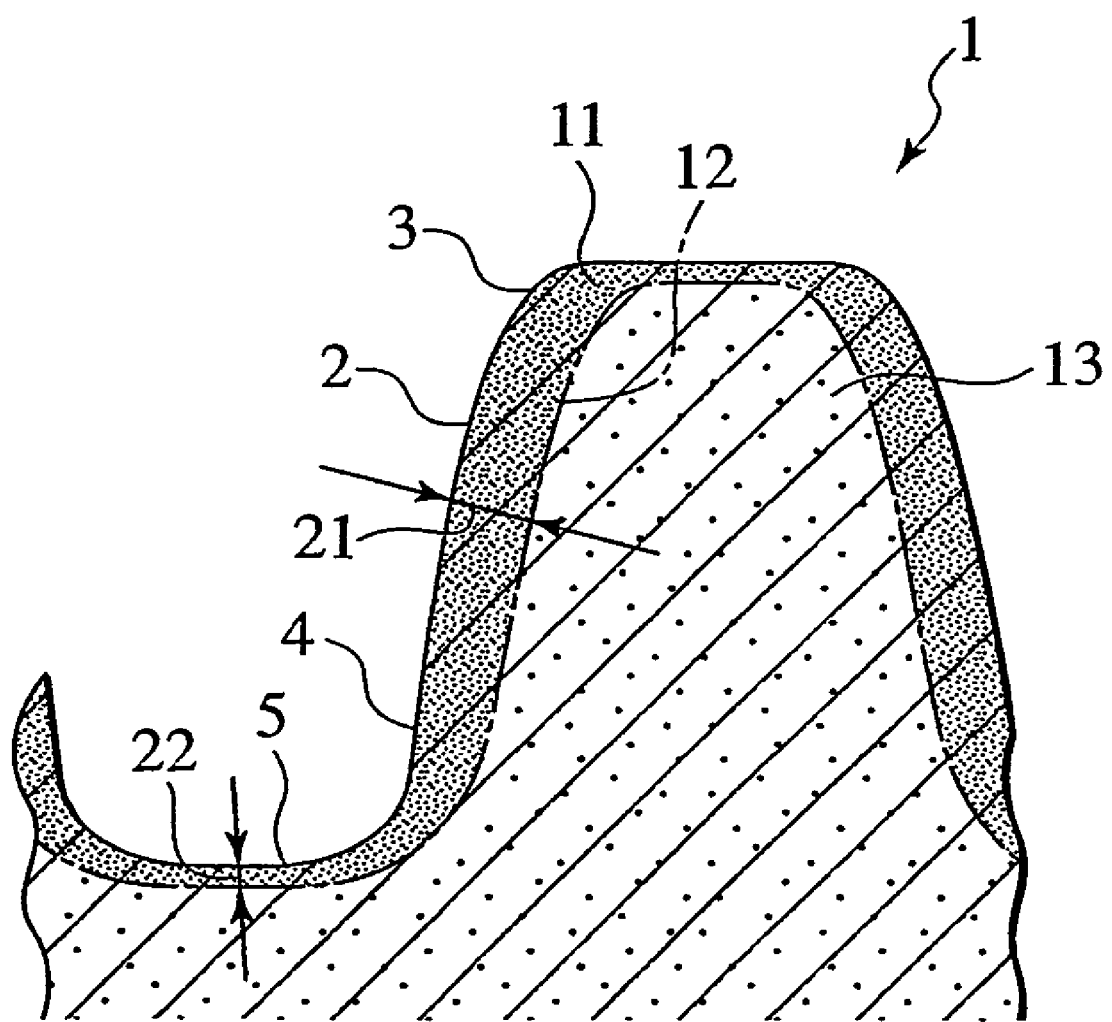
FIG. 1 is a partial cross-sectional view showing an embodiment of the sintered gear according to the present invention.

In engagement of gears or power transmission to a chain with a gear, rolling contact of the gear teeth generates stress. The position at which the stress by rolling contact becomes the maximum (hereinafter referred to as a stress concentration region) does not locate just on the tooth surface or the rolling contact surface (tooth flank to tooth face), but lies on a slight inside of the tooth surface. For this reason, in the sintered gear obtained by compacting and sintering a metal powder, fatigue strength of the teeth against the rolling contact can be improved by densifying the superficial portion at the tooth surface to provide an appropriate thickness of a densified layer that has a lower porosity than the inner portion (core). The sintered gear is generally composed of a sintered body having a porosity (volume ratio) of about 10 to 15%. According to the present invention, densification processing is performed so that the porosity is decreased to 10% or less and the densified layer is formed with a thickness (or a depth of the boundary surface between the densified layer and the core of the gear from the surface) of 300 to 1,000 microns. With the porosity more than 10%, sufficient fatigue strength is not possibly obtained. In other words, according to the present invention, the densified layer is defined as meaning the region where the porosity is reduced to 10% or less. In the densified layer, the porosity tends to increase in accordance with the positioning from the surface to the interior, and the porosity of the densified layer is thus represented by an average value of those from the superficial side to the interior side. If the thickness of the densified layer is less than 300 microns, the stress concentration region is located deeper than the densified layer, and the fatigue strength is therefore not possibly improved. On the other hand, if the thickness exceeds 1,000 microns, it is meaningless since further effect is not possibly obtained any more.

The above-mentioned formation of the densified layer can also be utilized for noise reduction of the gear. Noise reduction by the use of the densified layer will be described below.

In the case where the porosity of gear is entirely uniform, the vibration generated on the tooth surface due to engagement of the gears is transmitted through the matrix of sintered alloy toward a shaft which is fitted into the gear. In comparison with the above, if the densified layer of higher density is provided on the superficial portion of the tooth surface as described above, a difference of porosity is made between at the superficial portion and the interior portion and the vibration is likely to be selectively transmitted to the region of higher density. As a result, the vibration transmitted in the direction to the shaft is reduced and tends to easily attenuate. The vibration that is propagated from the vibration-generating location through the densified layer is diffused along the superficies of the gear and gradually attenuates with propagation. Propagation selectivity of vibration is important for improvement in noise reduction. The selectivity is improved according as the difference in porosity between the superficies of the densified layer and the inner core portion becomes large. Preferably, the difference of porosity is about 7% or more. In view of the above, it is preferred that the porosity of the sintered body forming the core portion of the sintered gear is about 10 to 15% and the porosity of the densified layer is about 1 to 9%, in terms of easy processing and overall strength balance.

Advantageously, the effect of improving the noise reduction through the vibration propagation is increased when the densified layer is provided at the contact-free bottom land and tooth crest as well as the tooth surface which contacts in gear engagement. In this case, the higher continuity between the densified layer of the tooth surface and the densified layers of the bottom land and the tooth crest is, the better vibration propagation is and reduction in noise is achieved. Therefore, it is desirable that the difference of porosity between these densified layers is small and there is no drastic change in porosity.

Since the bottom land and the tooth crest do not directly contact the other gear, it is unnecessary to deeply form the densified layer on them for impartment of fatigue strength against rolling contact. However, the bottom land suffers from the stress that generates when the tooth surface contacts a tooth of the other gear and the tension stress comes to concentrate on the bottom land. Therefore, densification of the superficial portion of the bottom land is also useful for improving tension strength. In consideration of these points, as for the bottom land, the densified layer having a porosity of 10% or less should be formed so as to have a thickness of 10 microns or more. If the thickness is less than 10 microns, the effects of the selective vibration propagation and improvement in tension strength are not produced sufficiently. Moreover, if the thickness exceeds 300 microns, the effect of noise reduction does not further increase, either. The most useful thickness of the densified layer is in a range of 10 microns to 300 microns.

As for the tooth crest, densification is unnecessary for improvement of strength. However, for the noise reduction, it is useful that the densified layer of the tooth surface subjected to rolling contact extends up to the other tooth surface located on its backside to make the transmission path of vibration continuous with the densified layer on the backside. Therefore, also in densification of the tooth crest, the densified layer is appropriately formed to have a porosity of 10% or less and a thickness from the surface ranging between 10 and 300 microns.

The shape of the boundary surface between the densified layer and the core portion (non-densified region) of the gear has a strong influence on the affect of stress and the behavior of vibration propagation. Specifically, if the boundary surface is discontinuously (that is, angularly) deflected or remarkably uneven, the stress concentrates on that portion, frequently causing material fatigue. Therefore, it is necessary that the boundary surface between the core portion and the densified layer of the gear is continuous (that is, smooth and non-angular) and has no substantially sharp difference in level or unevenness, and that it has such a shape that the thickness of the densified layer does not make a local and steep change.

The densified layer is possibly formed by subjecting a gear-shaped sintered body obtained by the sintering process to a pressuring process for pressing the surface, such as sizing, forming by rolling, extruding and the like, so as to compress the superficial portion. The pressuring process may be subjected so as to achieve by degrees through a plurality of separate steps or a combination of steps for plural kinds of processing. The shape of the sintered body is determined by taking the processing allowance that is a decrease by the pressuring process, into consideration for the shape of the completed gear. The processing allowance that compression is possibly achieved through a single step of pressing varies depending on the processing conditions, namely, a material to be processed, processing pressure, processing temperature and the like. Accordingly, in the case of forming by rolling, for example, a desirable densified layer can be produced in one step by adjusting the rolling allowance, the rolling pressure and the temperature according to the thickness and porosity of the densified layer to be formed.

A sintered alloy of a relatively low grade, which has been conventionally used as a structural sintered alloy, is applicable for the above-mentioned gear having the densified layer on its surface. Its specific examples include iron sintered alloy such as Fe—Cu—C alloy, Fe—Ni—Mo—C alloy and the like, and a sintered body having overall density of about 6.7 to 7.1 g/cm$^3$ and porosity of 10 to 15% is suitable for the gear material. In accordance with the general method, an alloy powder of the above-mentioned composition is pressed and compressed to form in the shape of a gear, and then sintered. The sintered body of a gear shape is subjected, as a gear material, to the aforementioned pressuring process to form the densified layer. Heat treatment may be subsequently performed as occasion arises. By manufacturing the sintered gear having the densified layer in this manner, the gear having improved strength and noise reduction characteristics than the conventional sintered gear can be obtained.

FIG. 1 is a radial cross-sectional view of a part of the gear showing an embodiment of the sintered gear according to the present invention. A densified layer 11 is formed on the surface of a tooth of a gear 1, and a boundary surface 12 dividing the densified layer 11 from an interior 13 of the gear is provided. A tooth surface 2, that is, a tooth face 3 and a tooth flank 4, is processed so that a thickness 21 of the densified layer 11 is 300 to 1,000 microns, and specifically 500 microns in this embodiment. On the other hand, a bottom land 5 is processed so that a thickness 22 of the densified layer 11 is 10 to 300 microns, and specifically 150 microns in this embodiment. The porosity of the gear interior 13 is 11 to 13% and that of the densified layer 11 is 0 to 11%. The densified layer 11 is formed so that the thickness does not change steeply and the boundary surface 12 is smoothly continued from the side of the tooth face 3 to the side of the bottom land 5. In other words, the boundary face of the densified layers of the tooth face 3 and the bottom land 5 is continued seamlessly and has no substantial level difference.

Figure 2:
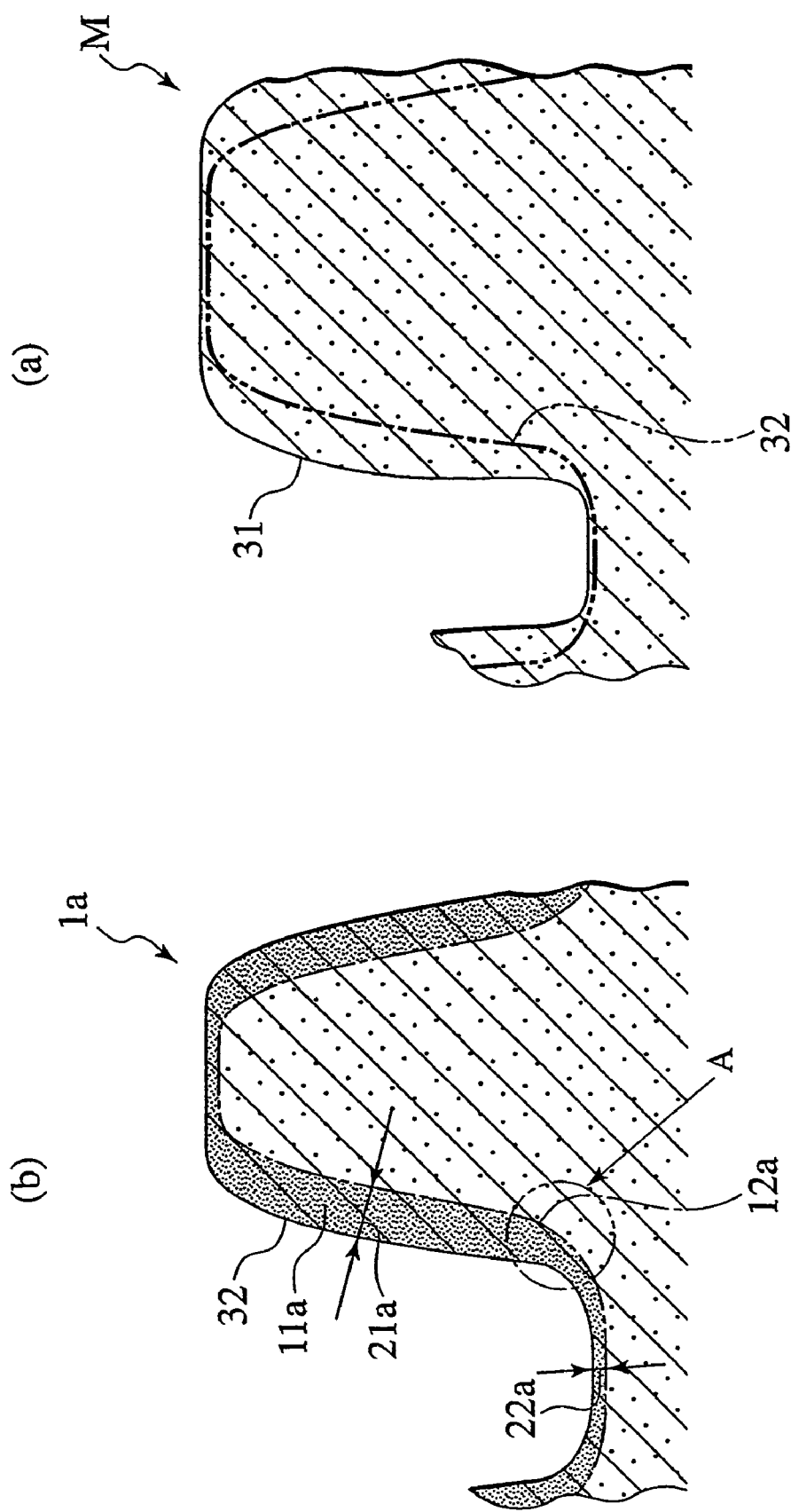
FIG. 2 is a view illustrating a forming step of the manufacturing process of the sintered gear according to the present invention.

FIGS. 2(a) and 2(b) are sectional views illustrating an example of a manufacturing process of the sintered gear shown in FIG. 1. FIG. 2(a) shows a tooth profile 31 of a gear material M before form rolling and FIG. 2(b) shows a tooth profile 32 of a gear 1a after form rolling. In FIG. 2(a), the tooth profile 32 after form rolling is represented by a dashed line and the difference between the tooth profiles after and before form rolling means a form rolling allowance. Porosity of the gear material before form rolling exceeds 10%. After form rolling, porosity of a densified layer 11a in FIG. 2(b) becomes 10% or less. In a junction A between the densified layer of the tooth surface and the densified layer of the bottom land, the thickness of the densified layer 11a gradually changes from 21a to 22b and a boundary surface 12a of the densified layer 11a is continuous (that is, smooth and non-angular). In other words, the boundary surface has no level difference caused by steeply changing the thickness of the densified layer.

FIGS. 3(a) and 3(b) are cross-sectional views showing the case where the gear of the same tooth profile 32 is manufactured by form rolling of a tooth material M' of a different tooth profile 31'. FIG. 3(a) shows the tooth profile 31' of the tooth material M' before form rolling and FIG. 3(b) shows a gear 1b after form rolling. The difference between the tooth profile 32 after form rolling and the tooth profile 31' before form rolling as shown in FIG. 3(a) means a form rolling allowance. At the part where the thickness of the form rolling allowance changes steeply, the thickness of a densified layer 11b steeply changes also in the gear 1b after form rolling from 21b to 22b, and a level difference is made in the boundary surface 12b at a junction B between the densified layer 21b of the tooth surface and the densified layer 22b of the bottom land. The stress applied on the densified layer at the time of rolling contact concentrates to the level difference portion of the junction B, and the boundary surface between the level difference portion and its inner portion is likely to be damaged. Moreover, when the vibration generating on the tooth surface by rolling contact propagates through the densified layer 11b, the vibration reflects on the boundary surface 12b at the level difference portion of the junction B and the ratio of the vibration propagating up to the densified layer of the bottom land is reduced due to a sudden narrowing in the vicinity of the level difference. By interference of the reflective vibratory wave, vibratory wave energy concentrates into the vicinity of the level difference.

By forming the densified layer as described above, a sintered gear having good strength and noise reduction characteristics is possibly obtained. Therefore, it is possible to effectively utilize a sintered gear having an overall density of about 6.7 to 7.1 g/cm³, taking advantage of lightness in weight as a merit of sintered alloy.

EXAMPLES

Example 1

A graphite powder was added to a ferroalloy powder having a composition by mass ratio of Fe-0.5% Ni-0.5% Mo (grain size: 80 mesh) to prepare a mixed powder (composition: Fe-0.5% Ni-0.5% Mo-0.3% C) in which the ratio of the graphite powder was 0.3 percent by mass. The following operation was performed using this mixed powder as a raw material powder.

Sample 1A

The raw material powder was pressed and compressed to form in a shape of a sprocket wheel. And it was sintered at 1,195 degrees C. to obtain a gear material. This gear material was subjected to a form rolling process and then heated at 900 degrees C. to obtain a sintered gear as Sample 1A having a densified layer as shown in FIG. 1 on the surface thereof. A form rolling allowance in the form rolling process was set to be 0.09 mm on the tooth surface and 0.02 mm on the bottom land and the tooth crest, and a form rolling pressure was set to be 3 ton.

As a result of measurement according to a measuring method defined by Japanese Industrial Standard Z2501, overall density of the sintered gear of Sample 1A was found to be 7.0 g/cm³. Moreover, a photographic image of a metallographic cross-section of a tooth of the sintered gear taken at a scale factor of 200 was analyzed by use of image analysis software to determine density distribution, and the porosity was calculated. As a result, porosity (volume ratio) of the densified layer was 2.5% at the outermost surface and 5% on average, and porosity of the inner core portion was 13%. Thickness of the densified layer was 1,000 microns over the tooth surface and 300 microns over the bottom land and the tooth crest. The boundary surface between the densified layer and the core portion seamlessly continued without level difference.

Meanwhile, the sintered gear of Sample 1A was fixed to a shaft and a chain was wound around a sprocket of this gear. Subsequently, the shaft was rotated under the conditions of gear rotational speed of 8,000 rpm and chain load of 29.4 N/m, and chain driving was continued for 100 hours. During this period, noise was measured, fixing a microphone at the location of 100 mm away from the gear. Moreover, after the chain driving, the amount of wear was measured. Table 1 shows the results of measuring the noise and wear amount.

Sample 1B

The raw material powder was formed in the same shape of a sprocket wheel as Sample 1A, by warm pressing, and sintered at 1,195 degrees C. to obtain a gear material. This gear material was heated at 900 degrees C. to obtain a sintered gear of Sample 1B.

As a result of the measurement according to the same measuring method as that used for Sample 1A, overall density of the sintered gear of Sample 1B was found to be 7.2 g/cm³. Moreover, density distribution of a metallographic cross-section of a tooth of the sintered gear was analyzed according to the same analyzing method as that used for Sample 1A. As a result, porosity was 12% on average.

Meanwhile, the sintered gear of Sample 1B was fixed to a shaft and chain driving was performed for 100 hours under the same conditions as those for Sample 1A. During this period, noise was measured at the location 100 mm away from the gear, as in the case of Sample 1A. After the chain driving, the amount of wear was measured. Table 1 shows the results of measuring noise and wear amount.

TABLE 1

| Sintered Gear | Wear Amount (μm) | Noise (dB) |
| --- | --- | --- |
| Sample 1A | 8 | 78 |
| Sample 1B | 60 | 80 |

From Table 1, it is apparent that although the sintered gear of Sample 1A is lower in material density than the sintered gear of Sample 1B, Sample 1A is superior to Sample 1B in wear resistance and noise reduction characteristics. Moreover, the gear of Sample 1A is possibly manufactured at lower cost.

Example 2

The same raw material powder as in Example 1 was subjected to the pressing, sintering, form rolling and heating processes according to the same method as that used for Sample 1A, excepting that the form rolling allowance in form rolling process was changed case by case in the range of 0.02 to 0.12 mm, to manufacture sintered gears (of Samples 2A to 2F) each having a densified layer of the thickness shown in Table 2 over the tooth surface, bottom land and tooth crest.

Figure 3:
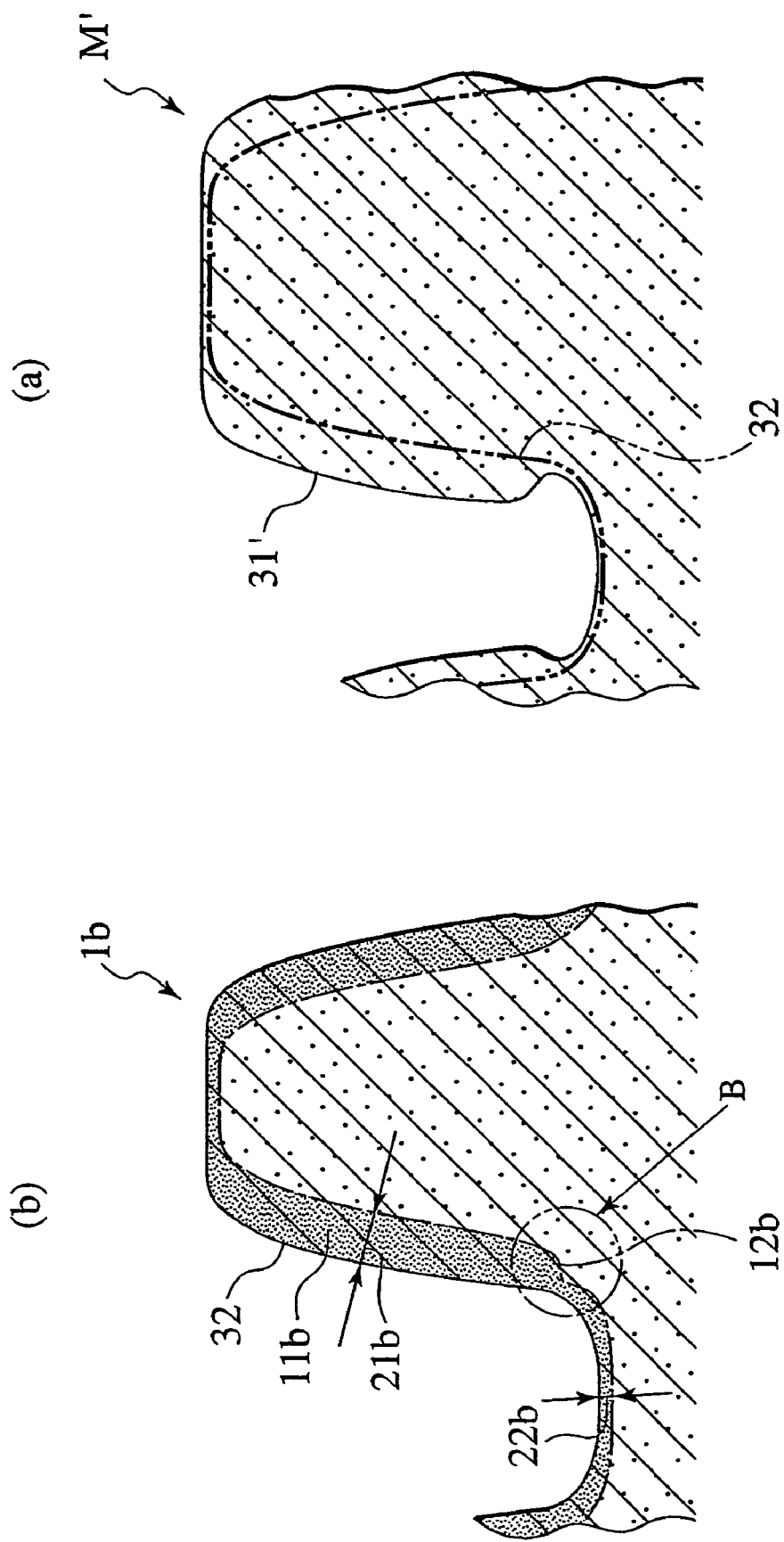
FIG. 3 is a view illustrating a forming step of a manufacturing process of the sintered gear.

Moreover, a sintered gear of Sample 2B' was manufactured by performing the pressing, sintering, form rolling and heating processes according to the same method as that used for Sample 2B, excepting that the shape of the sprocket of the formed compact had depression at its tooth flank as shown in FIG. 3.

For each of the sintered gears of Samples 2A to 2F, overall density was measured according to the same measuring method as that used for Sample 1A. As a result of measurement, overall density was found to be 7.0 g/cm³, respectively. Moreover, density distribution and porosity of a metallographic cross-section of a tooth of the sintered gear were analyzed according to the same analyzing method as that used for Sample 1A. As a result, porosity of the densified layer was 2.5% over the outermost surface and 5% on average and porosity of the inner core portion was 13%, respectively. Boundary surface between the densified layer and the core portion seamlessly was continuous without level difference. On the other hand, according to the analysis of the metallographic cross-section of the tooth of the sintered gear of the sample 2B', a level difference was found at a junction between the densified layer over the tooth surface and the densified layer of the bottom land.

Each of the sintered gears of Samples 2A to 2F and 2B' was subjected to a three-ball type pitching test to measure a bearing fatigue strength of the tooth surface. Moreover, a jig was contacted against the tooth face of the gear, and a load in the circumferential direction of the gear was applied repeatedly at 30 Hz until the tooth flank was broken, to determine the number of repetition when the tooth flank was broken. Based on the relationship between the load and the number of repetition at the time of breakage, a maximum load at which the tooth flank was not broken by the application of load of $10^7$ times was then determined, thereby flexural fatigue strength of tooth flank was measured.

The results of measurement are shown in Table 2.

TABLE 2

| Sintered Gear | Thickness of Densified Layer (μm) | Bearing Fatigue Strength (Mpa) | Flexural Fatigue Strength of Tooth Flank (Mpa) |
| --- | --- | --- | --- |
| Sample 2A | 100 | 2800 | 330 |
| Sample 2B | 300 | 3400 | 333 |
| Sample 2C | 500 | 3450 | 335 |
| Sample 2D | 750 | 3500 | 339 |
| Sample 2E | 1000 | 3550 | 341 |
| Sample 2F | 1500 | 3550 | 341 |
| Sample 2B' | 300 | 3400 | 290 |

According to Table 2, it is apparent that bearing fatigue strength is improved according as the thickness of the densified layer increases, and that improvement in fatigue strength is distinct especially in the layer having a thickness of 300 microns or more. However, when the thickness exceeds 1,000 microns, improvement in fatigue strength is small. From the above-mentioned results, it is confirmed that the effect of improving fatigue strength can be efficiently obtained in the densified layer having a thickness between 300 to 1,000 microns. It is also apparent that, when a level difference occurs on the boundary surface of the densified layer, fatigue strength at that portion is deteriorated.

Example 3

The same raw material powder as in Example 1 was subjected to pressing, sintering, form rolling and heating processes according to the same method as that used for Sample 1A, excepting that the form rolling allowance in form rolling process was changed case by case in the range of 0 to 0.06 mm, to manufacture sintered gears (of Samples 3A to 3F) each having a densified layer of the thickness shown in Table 3 over the bottom land.

As a result of measurement according to the same measuring method as that used for Sample 1A, overall density of the sintered gears of Sample 3A to 3F was found to be 7.0 g/cm³, respectively. Moreover, density distribution and porosity of a metallographic cross-section of a tooth of the sintered gear were analyzed according to the same analyzing method as that used for Sample 1A. As a result, porosity of the densified layer was 2.5% over the outermost surface and 5% on average and porosity of the inner core portion was 13%, in each sample. Boundary surface between the densified layer and the core portion was seamlessly continuous without level difference.

Each of the sintered gears of Samples 3A to 3F was fixed to a shaft and chain driving was performed for 100 hours under the same conditions as those for Sample 1A. During this period, noise was measured at the location 100 mm away from the gear, as in the case of Sample 1A. The results of measurement are shown in Table 3.

TABLE 3

| Sintered Gear | Thickness of Densified Layer (micron) | Noise (dB) |
| --- | --- | --- |
| Sample 3A | 0 | 80 |
| Sample 3B | 5 | 80 |
| Sample 3C | 10 | 79 |
| Sample 3D | 150 | 78 |
| Sample 3E | 300 | 77 |
| Sample 3F | 400 | 77 |

From Table 3, it is seen that noise level decreases according as thickness of the densified layer of the bottom land increases, and that the effect of reducing noise is distinct especially in the layer having a thickness of 10 microns or more. It is also understood that, when level difference is made on the boundary surface of the densified layer, the effect of reducing noise is reduced.

INDUSTRIAL APPLICABILITY

According to the present invention, a sintered gear having good strength and noise reduction characteristics during driving operation can be achieved, using an inexpensive powder composed of Fe—Cu—C alloy or Fe—Ni—Mo—C alloy, and there is no need to adopt a raw material powder having a quality of special high grade. Accordingly, applicability of the sintered gear expands, and it can be utilized as means of reducing weight of devices equipped with a gear, cutting manufacturing costs and reducing noise.

The invention claimed is:

1. A sintered gear composed of a sintered alloy having a metal matrix and pores, comprising:
   a first densified layer that is formed on a tooth surface with a thickness of 500 to 1,000 microns and porosity of 10% or less; and
   a second densified layer that is formed on a bottom land with a thickness of 10 to 300 microns and porosity of 10% or less, in which a boundary of the first densified layer being continuous with a boundary of the second densified layer without a substantial level difference, wherein the porosity of the sintered alloy is 10 to 15%, and the difference in porosity between the sintered alloy and an outermost surface of each of the first densified layer and the second densified layer is respectively 7% or more by volume.

2. The sintered gear of claim 1, further comprising:
a third densified layer that is formed on a tooth crest with a thickness of 10 to 300 microns and porosity reduced from said sintered alloy to 10% or less, in which the boundary of the first densified layer being continuous with a boundary of the third densified layer without a substantial level difference.

3. The sintered gear of claim 1, wherein the sintered alloy is a Fe—Cu—C alloy or a Fe—Ni—Mo—C alloy.

4. The sintered gear of claim 1, wherein the sintered alloy has a composition of Fe-0.5% Ni-0.5% Mo-0.3% C by mass.

5. The sintered gear of claim 1, having an overall density of 6.7 to 7.1 g/cm$^3$.

6. The sintered gear of claim 1, in use for power transmission through convex teeth engaging with each other.

7. The sintered gear of claim 1, in use as a sprocket wheel for power transmission to a chain.

* * * * *